United States Patent [19]

Duncan et al.

[11] 3,755,205

[45] Aug. 28, 1973

[54] METHOD OF MAKING A CATALYTIC BED

[75] Inventors: William A. Duncan; James A. Murfree, Jr., both of Huntsville, Ala.

[73] Assignee: The United States of America as represented by the Secretary of the Army, Washington, D.C.

[22] Filed: Mar. 28, 1972

[21] Appl. No.: 238,926

[52] U.S. Cl......... 252/458, 117/46 CA, 117/46 FA, 117/123 B
[51] Int. Cl....... B44d 1/40, B44d 1/44, B01j 11/06, B01j 11/50
[58] Field of Search ............... 60/219, 220; 149/36; 117/46 CA, 46 FA, 46 FC, 123 A, 123 B; 423/606; 252/458

[56] References Cited
UNITED STATES PATENTS

| | | | |
|---|---|---|---|
| 3,608,313 | 9/1971 | Guth et al............................. | 60/219 |
| 2,551,712 | 5/1951 | Soby................................ | 117/46 CA |
| 2,842,457 | 7/1958 | Morgan et al.................. | 117/46 CA |
| 3,189,477 | 6/1965 | Shaffer........................... | 117/46 CA |
| 2,748,033 | 5/1956 | Gentry et al. ................... | 117/46 CA |

Primary Examiner—William D. Martin
Assistant Examiner—M. Sofocleous
Attorney—Harry M. Saragovitz, Edward J. Kelly et al.

[57] ABSTRACT

Method for making a catalytic bed for a gas generator by saturating an inert porous support material with a molybdenum resinate and turpentine solution, and decomposing the solution to leave a residue coating on the inert porous support material and thereby form a catalytic bed.

4 Claims, No Drawings

METHOD OF MAKING A CATALYTIC BED

CROSS-REFERENCE TO RELATED APPLICATION

This application is a division of applicants' co-pending application Ser. No. 68,580, filed Aug. 31, 1970.

BACKGROUND OF THE INVENTION

In the past, liquid gas generators have utilized inert beds with a catalyst such as the Shell 405 catalyst and inert beds with various oxidizing agents such as $I_2O_5$, $HIO_3$ and $KMnO_4$. In these type gas generation schemes, the catalytic beds are very expensive, and the inert beds with oxidizing agents have limitations as to the number of times they can be restarted. Some of these arrangements are also very expensive due to the chemicals used therein. Accordingly, a need exists for a reliable catalytic bed that has the ability to cause hydrazine to spontaneously decompose on a multiplicity of starts of the gas generator.

Therefore, it is an object of this invention to provide a method for producing a true catalytic bed that utilizes chemicals that bring about spontaneous exothermal and gas producing decomposition of hydrazine type monopropellant fuels.

Another object of this invention is to provide a method for making a catalytic bed that can be used for starting and sustaining decomposition for a multiplicity of times with hydrazine type monopropellant fuels.

A further object of this invention is to provide a catalytic bed that is relatively easy to make and that can be made with varying amounts of the catalytic agent therein.

A still further object of this invention is to provide a true catalytic bed that utilizes chemicals that are relatively cheap in comparison to other true catalytic beds.

SUMMARY OF THE INVENTION

In accordance with this invention, an inert porous support material such as fire brick or various corrugated ceramics is saturated with a molybdenum resinate solution, and thereafter, the solution is decomposed such as by burning to leave a residue coating of molybdenum and/or molybdenum oxides on the inert porous support material and thereby form a true catalytic bed. When a monopropellant such as hydrazine ($N_2H_4$) is brought into contact with the true catalytic bed, a spontaneous exothermal and gas producing decomposition occurs.

DETAILED DESCRIPTION OF THE INVENTION

It has been discovered that molybdenum in the form of molybdenum resinate solution can be used as a means of depositing a true catalytic coating of molybdenum and/or molybdenum oxides on an inert gas generator bed or support. This technique is applied to the "chemi-thermo" type gas generator. Briefly, this gas generator concept involves the thermal decomposition of an exothermic monopropellant such as hydrazine on a porous bed or support such as insulating fire brick or various corrugated ceramics. The scheme depends on a hypergolic reaction between the propellant and a chemical initiator to heat the bed to a temperature at which the propellant will sustain thermal decomposition on the hot surface.

The metal that has been found to be very successful as a true catalyst is molybdenum deposited from a molybdenum resinate and turpentine solution which lends itself readily to the deposition of a uniform coating of true catalytic metal on the surface of a porous bed or support such as insulating fire brick or various corrugated ceramics which have porous walls. The solution is poured over the porous bed or support material which absorbs the liquid like a sponge until it is saturated.

The solution is then decomposed by some means, such as burning, allowing the organic part of the solution to burn off, but leaving a coating of molybdenum and/or the oxides of molybdenum deposited on the surface of the bed or support. The weight of the deposit may be varied according to the number of applications as above.

Insulating firebrick with a porosity of approximately 73 percent works well, and insulating fire brick with a porosity from 50-80% can be used. Zircon mullite corrugated ceramic with a wall porosity of 25-30 percent also works well. When the mullite ceramic material is used, it is used as a multiplicity of turns so that an overall unitary structure of ceramic with the spaces defined between each wall has an overall porosity of from 60 to 90 percent depending upon the closeness of the walls to each other.

Injection of hydrazine ($N_2H_4$) onto the coated support results in spontaneous exothermal, gas producing decomposition. The metal coating, being truly catalytic, is not consumed. After combustion of the propellant is completed and the support has cooled down to ambient temperature, subsequent additions of hydrazine have the same result. Samples have been tested successfully dozens of times with hydrazine over an extended period of time.

The molybdenum resinate solution contains from about 2 to about 15 percent by weight molybdenum metal to resinate material. This molybdenum resinate solution is diluted with pure turpentine and preferrably, an equal amount by weight of pure turpentine to the molybdenum resinate solution. The preferred amount of molybdenum to resinate material is about 10 to about 15 percent and the amount of turpentine can vary. Pre-mixed molybdenum resinate solutions that are within the limits of this invention are commercially marketed by Hanovia Liquid Gold Division of Engelhard Industries Incorporated under the names "Molybdenum Resinate Solution No. 8605" approximately 13.3% Mo and "Molybdenum Resinate Solution No. 42" approximately 3.3% Mo.

EXAMPLE I

A coating solution from the commercially available material is prepared by diluting the "as received" molybdenum resinate solution No. 8605 with an equal weight of turpentine, pure gum spirits. The inert support material to be coated is saturated with the molybdenum resinate and turpentine solution, and the saturated support is ignited with a match or splint. After the burning has ceased and the solvent has burned off and presumably the organic part of the metal resinate, the inert support material remains with a coating of molybdenum and/or molybdenum oxides. One application of the turpentine-metal resinate solution to the inert support material such as insulating fire brick and subsequent burning leaves an approximately 6 to 10 percent coating on the inert support material, which coating is active towards hydrazine.

Two applications, followed by burning after each, leaves approximately a 20 to 22 percent, by weight, coating on the inert support material. This catalyst, thus prepared, also brings about spontaneous decomposition of hydrazine. Thus, the amount of coating of active catalytic material on the support may be varied by the amount of dilution done, if any, of the "as received" metal resinate or by making repeated applications of the diluted metal resinate to the support with burning off of the solvent and organic material following each application.

EXAMPLE II

Molybdenum resinate may be prepared from abietic acid (resin acid) by dissolving abietic acid in alcoholic potassium hydroxide (0.5N KOH in 95 percent ethanol). To the alcoholic potassium abietate solution is added a solution of molybdenum pentachloride in methanol (1 M $MoCl_5$). A deep blue precipitate is formed which is removed by vacuum filtration. The precipitate is washed on the filter with several small portions of water and then air dried. The precipitate, after drying, is dissolved in turpentine to form a molybdenum resinate coating solution. The molybdenum resinate solution may contain 1 to 15 weight percent of the precipitate to the turpentine.

As in Example I, the inert support material to be coated is saturated with the molybdenum resinate and turpentine solution, and the saturated support is ignited with a match or splint. After burning has ceased and the solvent has burned off and presumably the organic part of the metal resinate, the inert support material remains with a coating of molybdenum and/or molybdenum oxides. One application of the turpentine-metal resinate solution to the inert support material such as insulating fire brick and subsequent burning leaves an approximately 6 to 10 percent coating on the inert support material, which coating is active towards hydrazine.

Two applications, followed by burning after each, leaves approximately a 20 to 22 percent, by weight, coating on the inert support material. This catalyst, thus prepared, also brings about spontaneous decomposition of hydrazine. Thus, the amount of coating of active catalytic material on the support may be varied by the amount of dilution with turpentine or by making repeated applications of the diluted metal resinate to the support with burning off of the solvent and organic material following each application.

The catalyst which is prepared as described herein is very active with respect to bringing about the spontaneous, exothermal, gas producing decomposition of hydrazine. The catalyst maintains its activity upon repeated firings with hydrazine even upon long periods of cool down between firings. It has been observed that there is some slight weight loss in the catalyst upon repeated firings with hydrazine. A sample of the catalyst has been fired at least 36 times over a period of several weeks with little, if any, reduction in activity toward hydrazine.

The catalyst described herein is slowly reactive towards the propellant MHF-3 (86 percent methylhydrazine and 14 percent hydrazine) when tested at room temperature.

The real advantages of this gas generator catalyst over other gas generator catalysts is a combination of low cost and the ability to spontaneously decompose the storable hydrazine propellants. The true catalyst disclosed herein appears far superior in its reaction with these storage propellants to any of the commercially available catalysts.

We claim:

1. The method of making a catalytic bed for a gas generator comprising saturating an inert porous support material of porous fire brick or corrugated ceramic with a solution of equal parts by weight of molybdenum resinate and turpentine, and decomposing the solution by burning to leave a coating on the inert porous support material.

2. The method of making a catalytic bed as set forth in claim 1, wherein said coating contains molybdenum.

3. The method of making a catalytic bed as set forth in claim 1, wherein said coating contains molybdenum and molybdenum oxides.

4. The method of making a catalytic bed as set forth in claim 1, wherein said porous fire brick has a porosity from 50 to 80 percent and said corrugated ceramic has an overall porosity of from 60 to 90 percent.

* * * * *